US007229263B2

(12) United States Patent
Silbermann et al.

(10) Patent No.: US 7,229,263 B2
(45) **Date of Patent: *Jun. 12, 2007**

(54) PRESSING DEVICE FOR MANUFACTURING OF SHAPED COMPACTS FROM PULVERIZED MATERIAL

(75) Inventors: Michael Thomas Silbermann, Bichl (DE); Walter Rau, Grossweil (DE); Johann Meyer, Königsdorf (DE)

(73) Assignee: Dorst Technologies GmbH & Co. KG, Kochel Am see (DE)

( * ) Notice: Subject to any disclaimer, the term of this patent is extended or adjusted under 35 U.S.C. 154(b) by 398 days.

This patent is subject to a terminal disclaimer.

(21) Appl. No.: 10/719,932

(22) Filed: Nov. 21, 2003

(65) Prior Publication Data

US 2004/0137100 A1 Jul. 15, 2004

(30) Foreign Application Priority Data

Nov. 22, 2002 (DE) ................................ 102 54 656

(51) Int. Cl.
*B29C 43/32* (2006.01)

(52) U.S. Cl. ..................... 425/78; 425/348 S; 425/355; 425/412; 425/414; 425/DIG. 58

(58) Field of Classification Search .................. 425/78, 425/DIG. 58, 352, 355, 410–412, 348 S
See application file for complete search history.

(56) References Cited

U.S. PATENT DOCUMENTS 4,370,119 A * 1/1983 Watanabe ................... 425/352
4,392,800 A 7/1983 Apuzzo
4,482,307 A 11/1984 Schaidl et al.
5,043,111 A 8/1991 Hinzmann et al.
5,288,440 A 2/1994 Katagiri et al.
5,476,631 A 12/1995 Brown et al.

(Continued)

FOREIGN PATENT DOCUMENTS

DE 29 51 716 7/1981

(Continued)

*Primary Examiner*—Yogendra N. Gupta
*Assistant Examiner*—Thu Khanh T. Nguyen
(74) *Attorney, Agent, or Firm*—Knobbe Martens Olson & Bear LLP

(57) ABSTRACT

The present teachings describe various aspects of a pressing device for manufacturing of shaped compacts from pulverized or granulated material. In one aspect, the pressing device includes a frame structure, which, via a lower connection device adapter-like, can be connected to a lower press frame means of a press and a die holding plate arranged in the frame structure. Moreover, the pressing device may further include a base body arranged within the frame structure, the die holding plate, and the base body being arranged in the frame structure relatively movable one to each other, a plurality of punch carriers, at least one part of them being mounted on the frame structure being movable in press direction relatively to the die holding plate and relatively to the base body, and supporting devices which support the punch carriers relative to the base body in the final press position. Furthermore, to facilitate a modular arrangement and a better supporting, there is suggested to arrange the supporting devices between the base body and the punch carriers in such a way, that at least one of the supporting devices is supported in relation to the base body through another of the supporting devices.

20 Claims, 4 Drawing Sheets

U.S. PATENT DOCUMENTS

| | | | | |
|---|---|---|---|---|
| 5,498,147 | A * | 3/1996 | Katagiri et al. | 425/78 |
| 6,656,395 | B2 | 12/2003 | Menzel | |
| 6,902,698 | B2 * | 6/2005 | Rau et al. | 425/78 |
| 2003/0015813 | A1 | 1/2003 | Rau et al. | |

FOREIGN PATENT DOCUMENTS

| | | | |
|---|---|---|---|
| DE | 37 15 077 | C2 | 5/1987 |
| DE | 42 03 401 | A1 | 2/1992 |
| DE | 42 09 767 | | 5/1993 |
| DE | 42 27 640 | | 2/1994 |
| DE | 197 17 217 | C2 | 4/1997 |
| EP | 0 436 792 | | 11/1990 |
| EP | 0 490 148 | A2 | 6/1992 |
| JP | 07290294 | A | 11/1995 |
| JP | 2000042793 | | 2/2000 |

* cited by examiner

PRESSING DEVICE FOR MANUFACTURING OF SHAPED COMPACTS FROM PULVERIZED MATERIAL

CLAIM OF PRIORITY

This application claims priority to German Patent Application No. DE 102 54 656.8-14 filed Nov. 22, 2002, which is hereby incorporated in its entirety by reference herein.

BACKGROUND OF THE INVENTION

1. Field of the Invention

The invention relates to a pressing device for pressing of shaped compacts, especially from a pulverized material.

2. Description of the Related Art

Generally, presses of that kind serve for pressing of powder or granulates made from iron, plastic material, hard metal, ceramic base materials or the like, to compacts, e. g. gears or molded parts. Because of the high specific compression pressure of partly 30–100 kN/cm$^2$ and more, a very high stability of the pressing device is required.

Schaidl et al., U.S. Pat. No. 4,482,307 (DE 31 42 126 C2) discloses a modular press comprising the actual press for applying a main pressing force and a pressing device, which, adapter-like, can be inserted in the actual press. This insertable pressing device comprises a tool frame, which via an upper and a lower connection device is coupled between the two press rams of the press. Basically, the adapter-like pressing device consists of a frame structure of pull rods for guiding a plurality of plates, punch carriers and a die plate located between the connection devices which are also arranged or mounted on a bearing on said frame structure. According to this arrangement a base plate having hydraulic devices for the relative moving of single plates, which are configured as punch carriers, is supported in the actual press with a bearing attachment. In relation to this base plate, the further plates are supported in the frame structure in a displaceable way. Via the frame structure, the die holding plate is rigidly connected with the lower connecting device of the adapter and with regard to the upper connecting device of the adapter arranged in the frame structure in a movable way. In relation to the base plate, the individual punch carriers are hydraulically movable, being therefore, as a result of it, displaceable between a filling position, in which the die opening of the die holding plate can be fed with powder, and a final press position, in which the powder is pressed into a compact by press punches. The punches for pressing the powder are seated on the respective punch carriers. When being in the final press position the respective punch carriers are supported on end stops. Both, piston/cylinder devices for the hydraulic driving of the individual punch carriers as well as the end stops, especially fixed stops, are arranged in the outer peripheral region of the punch carriers and being spaced away from the respective central openings of the individual punch carriers. There, the central openings in the individual punch carriers are configured in such a way, that always those punches, which are seated on a punch carrier, which is more distant from the die holding plate, can be guided through the openings of those punch plates which are situated nearer to the die holding plate.

To improve guidance of the punch carriers there is known from Fleissner et al., EP 436,792 (DE 40 00 423 C2) a press for producing shaped compacts from powdered material, which comprises an upper and a lower press ram and a tool frame being adapter-like inserted in the press and being via a lower coupling plate connectable with the lower ram and being connectable via an upper connecting piece with the upper ram. On a base plate of the tool frame, which is firmly supported in the press, there is provided a displaceably supported frame structure of pull rods, which rigidly connect the lower coupling plate with a die holding plate. Furthermore, punch carriers are movable from the base plate into the filling and press position by piston/cylinder drives. For improvement of the guidance it is suggested the punch carriers to be designed as pots being guided relative to the base plate along cylindrical surfaces. Also in this arrangement the punch carriers are supported against end stops in the final press position.

Both arrangements require a careful adjustment of the individual punch carriers relative to each other and relative to the frame structure, in order to avoid wedging or uneven pressing. A particular problem in this process is the position of the end stops, which from the base plate touch the lower part of the outer rim of especially the third punch carrier far distant from the central opening. In the final press position as a result of it, the corresponding punch carriers are supported on an end stop on its outside while an opposite pressing force is acting on the punches, which in the neighboring through opening are supported on the inner side. This causes a deflection of the punch carrier, which in practice has to be compensated with a plurality of single trials in order to adjust the pressing forces. Furthermore, for high press cycles, re-adjustment has to be carried out, regularly, in order to compensate, for example, influences of fluctuating powder qualities.

Furthermore, such presses for manufacturing of shaped compacts are disclosed in DE 42 27 640 A1 or U.S. Pat. No. 4,392,800.

In Rau et al., U.S. 20030015813 A1 (DE 101 35 523) a pressing device is disclosed, in which supporting devices are arranged for supporting of punch carriers between a base body and the relating punch carriers such that punches sitting on the punch carriers are centrally supported in the final press position via the supporting devices acting in the line of force.

An object of the invention is to improve a press for the manufacturing of shaped compacts, essentially from pulverized material in such a way that a frame structure having different components to be inserted in a press can be easily assembled for the most different requirements. A further object of the invention with respect to the supporting devices is to provide an improved arrangement for the punch carriers.

SUMMARY OF THE INVENTION

In an embodiment a pressing device for manufacturing of shaped compacts, especially from pulverized or granulated material, especially made from iron, plastics, hard metal or ceramic material components, comprises a frame structure, being connectable adapter-like via a lower connection device with a lower press frame means of a press, a die holding plate, arranged in said frame structure, a base body arranged in said frame structure, said die holding plate and said base body being arranged in said frame structure to be displaceable relatively one to the other, a plurality of punch carriers at least one part of them being displaceably mounted at said frame structure relatively to said die holding plate and relatively to said base body to be displaceable between them in the direction of a central axis running in press direction, and supporting devices supporting said punch carriers in a final press position relative to said base body, characterized in that said supporting devices are arranged such between said base body and said punch carriers, that at least one of said supporting devices is supported by another of said supporting devices in relation to said base body.

When supporting devices are arranged between the base body and the punch carriers in such a way that at least one of the supporting devices is supported by another one of the supporting devices a pressing device for manufacturing of shaped compacts, especially from pulverized or granulated material, especially iron powder or ceramic powder, is improved advantageously. The support of such an arrangement within the adapter-like frame structure, which is clamped into a press and which contains a die holding plate and a base body being relatively displaceable one to each other facilitates a robust and modular assembly. There, appropriate punch carriers are assigned to the supporting devices at least one part of which mounted in the frame structure and being seated displaceable between and relative each, the die holding plate and the base body, the punch carriers being supported by the supporting devices relative to the base body in the final press position.

Advantageous is a pressing device, wherein at least one of said supporting devices is arranged around said central axis and wherein around said axis is left a free space for through leading of punch carriers and punches, which are related to said base body and to said at least one of said supporting devices, respectively, being arranged below said supporting devices.

Accordingly, at least one part of the supporting devices is arranged around the central axis, which runs in pressing direction through the pressing device, having a free space for the punch carriers and the punches, which are assigned to below arranged supporting devices. Such an assembly makes possible an arrangement for central supporting of the punches seated on the punch carriers, in the final press position almost in the line of force. This applies to the respective press punches, punch carriers and supporting devices, which are seated near the central axis, and applies, furthermore, also to the punches, punch carriers and supporting devices, which are arranged outwardly. According to the whole arrangement the result, therefore, is a support level by level from the base plate, punch carriers being seated on a first supporting device and punches seated on the punch carriers are carried by this base plate and wherein the first supporting device, furthermore, carries a further supporting device.

Advantageous is a pressing device, wherein at least one of said supporting devices centrally supports punch carriers and punches seated thereon and wherein said at least one of said supporting devices supports at least one further above arranged punch carrier in said final press position approximately in said line of force.

On the further supporting device in addition to a punch carrier and punches, in similar arranged arrangements one above the other, further supporting devices with punch carriers and punches are arranged.

There, the punch carriers and punches, advantageously, are seated on an interior supporting area on the assigned supporting device, while a further supporting device can be placed on the exterior supporting area of the supporting device. The line of force, as a result of it, applies in a more or less straight line from the punches via the punch carriers into the assigned supporting device. Furthermore, the line of force is applied continuously into a lower seated supporting device and, therefore, is applied continuously in straight line in direction of the pressing force, when the supporting devices are put one above the other, making it possible to avoid shearing forces and the like.

By means of a modular arrangement, especially, intermediate levels or upper levels can be omitted. Simple changes of size of the individual components make possible a simple adaptation of the whole pressing device to each of the compacts, which have to be manufactured, respectively. Also powder compositions and the like can be considered. Based on the modular system, for example, changes of filling heights can be considered by the selection of components having suitable sizes.

Advantageously, at least one part of the supporting devices comprises a supporting device element, which seen from the side of supporting device sticks out or protrudes from the supporting device in direction to the central axis which carries an assigned punch carrier. In the final press position the line of force is displaced from the punch over the punch carrier, which is seated on the supporting device element, in direction of the inside to the central axis. Thus, the line of force effecting of course away of the straight line of force in pressing direction through the supporting device. However, it is possible to carry out this displacement in such a short way that an almost straight line of force, despite of it, can be assumed in the final press position.

Advantageously, the punch carriers, or at least one of them, are seated or fixed on the supporting device with a punch carrier height adjusting device in a height adjustable manner in direction to the central axis relative to the supporting device supporting this punch carrier. A particularly simply constructed punch carrier height adjusting device comprises an essentially cylindrical assembly. A stationary supporting device adjusting element being relatively seated to the supporting device, and a relatively to the punch carrier arranged stationary lower punch carrier element are arranged, advantageously, in a cylindrically or tubular way one in the other, whereby the walls, which are turned one to each other comprise threads meshing into each other. In order to relatively adjust the height of the punch carrier and the supporting device screwing of the supporting device adjusting element relative to the punch carrier element around the central axis is sufficient.

Advantageously, the supporting device, especially in connection with the punch carrier height adjusting device, can be formed such that the supporting device in the final press position is dimensioned and constructed as an end stop.

The supporting device, advantageously, comprises a supporting device element as a stop element with the corresponding dimensions, especially, a supporting device element which sticks out or protrudes in direction to the central axis, to form a counter stop, in the filling or demolding position, for a height limiting stop element of a punch carrier of a lower arranged supporting device. In an ideal embodiment the supporting device element, therefore, assumes different functions as end stop, as carrier element for the punch carrier above the supporting device and at the same time as counter stop for the height limiting stop element for a deeper lying punch carrier, i.e. at least one of said supporting devices, especially a protruding supporting device element, is dimensioned and arranged as stop element and is constructed to constitute a counter stop for a height limiting stop element of at least one of said punch carrier, of said base body and of a lower arranged supporting device, respectively, in the filling or demolding positions.

Such a height limiting stop element is arranged at the punch carrier being relatively adjustable in height, purposefully in the direction of the central axis, relative to the punch carrier, in order to make possible simple adjustments to changed amounts of powder and the like. Also, for the height limiting stop element there in a particularly preferred embodiment a cylindrical arrangement recommends itself. Accordingly the height limiting stop element comprising an inside cylindrical circumference with an internal thread meshing with a corresponding external thread on the outside circumference of the assigned punch carrier. Thereby, a height adjustment is moved in the same direction as the height limiting stop element by simple screwing the punch carrier and the surrounding height limiting stop element relative to the punch carrier around the central axis. Accordingly, a height adjusting drive for adjusting the punch carrier is displaced in the same direction as the punch carrier according to required lifting heights, advantageously, when adjusting takes place. The height adjustment of the height adjusting drive together with the height adjustment of the punch carrier or the height limiting stop element takes place, in the process, by the corresponding choice of pitch and, if need be, by opposite courses of pitch of different gear elements in such a way that the height adjusting drive is lifted in the same amount as the punch carrier or the height limiting stop element. The height adjusting drive preferably is a hand crank mechanism or a motor.

Advantageous is a pressing device, wherein said height adjusting drive drives a first threaded element, in particular a threaded spindle, moving said height adjusting drive relatively to said supporting device and relatively to said punch carrier, respectively and comprising a toothed wheel which is fastened on said threaded element and co-rotating around the longitudinal axis of said threaded element, said toothed wheel or one or more toothed gears, which are put in between, mesh with said toothing on said exterior circumference of said punch carrier height adjusting device or on said exterior circumference of said height limiting stop element, respectively, in a co-rotating way.

To construct the height adjusting drive with different threaded elements and meshing gear wheels has an advantage especially in that cases where the height limiting stop element or the punch carrier height adjusting device comprises on its outer circumference a gear toothing meshing with a rotating gear wheel of the height adjusting drive. Thus, in the final press position and also in the filling or demolding positions an uncoupling of force takes place between the elements, especially the punch carrier height adjusting device and also the height limiting stop element, which are clamped in the line of force, since the meshing teeth do not have any coupling of force in the pressing force direction.

Advantageous is a pressing device, wherein said height adjusting drive is constructed as being insertable into each other in a modular way by at least one threaded bore drill and/or a reception bore without a thread within it.

In order to make possible the modular constructing of the height adjusting drive there are configured appropriate receiving devices, in particular thread bores and the like, in the corresponding punch carriers or in the punch carrier plates which protrude at the side of them. Threaded bores thereby serve in particular for the insertion of a threaded shank which is turned around together with the height adjusting movement and which when rotating lifts or lowers the individual elements of the height adjusting drive.

The installation of an actual position sensor for the determining of a relative actual position between at least one of the supporting devices, a punch carrier being supported therefrom, and the base body makes possible an especially simple modular arrangement. An actual position sensor can be used according to simple embodiments, in order to warn an operation engineer in the case of incorrect positions. In particular, the use of such an actual position sensor makes possible also a closed-loop control of a process in order to adjust the movements of the different punch carriers relative to each other and/or relative to the base body according to a set course if the need arises. There, particularly, also a hydraulic controlling is possible instead of the altering of height adjusting drives, which modularly can be omitted. In addition, an application of the basic principle to presses having hydraulic control of the press sequences can be carried out.

Advantageously, there can be provided a tensioning device, in particular a tensioning plate, being placed between an upper supporting device and the die holding plate. The tensioning device serves for the tensioning of the supporting devices, which are supporting each other relative to the base body.

Advantageous is a pressing device, wherein at least one of said supporting devices comprises a supporting device supporting section for supporting of a higher arranged supporting device or for supporting of a supporting device intermediate means being put in between, said supporting surface of said supporting device supporting section being arranged more deeply than a punch carrier supporting surface.

Advantageous is a pressing device, wherein two supporting devices partly reaching one into the other and being arranged one above the other are arranged one in the other in such a way, that between the laterally neighboring surfaces there is a gap via which remaining powder is carried away laterally and at the same time in downwardly direction. Therefore, especially advantageous is the dimensioning of the lateral walls of the supporting devices in such a way that a gap remains between further supporting wall devices, punch carriers or punches, which can be used to take away excess of powder. In the gap, advantageously, a powder cone is built when appropriate dimensioning takes place, such that later following powder is being taken away in a laterally sloped downwardly direction.

According to a further especially preferred embodiment the single punch carriers are built-up in a modular way also with respect to synchronization rods.

An advantageous pressing device comprises at least one synchronization rod for synchronizing an equally directed and equally spaced movement of an upper press block element in relation to at least one of said punch carriers, wherein said synchronization rod leads through synchronizing rod through leading openings formed in modularly constructed punch carrier plates laterally of above arranged punch carriers and comprises a synchronization rod stop element, in order to support said synchronization rod at a selected punch carrier plate within an area around said synchronization rod through leading opening.

Synchronization rods serve for synchronizing a movement of an upper press block with the movement of one or more punch carriers, in order to lower, in a synchronic way, the powder chamber constituted with the powder, when powder contact of the upper plate with the powder, which is filled into the die opening occurs, what, generally, also is denoted as powder transport. According to a modular arrangement there are formed synchronization rod through leading openings in the punch carriers and in the punch carrier plates, respectively, which laterally protrude out of the punch carriers, so that thereby, in principle, a synchronization rod, which leads down from the upper press block, can pass through all punch carrier plates from above in downwardly direction. The synchronization rods are equipped with a synchronization rod stop element, which comprises a larger circumference than the corresponding synchronization rod leading through openings below. Advantageously, such a synchronization rod stop element is configured like a flange or a shoe in order to support the synchronization rod on the surface around the synchronization rod through leading opening of a selected punch carrier plate, thereby being synchronized.

Preferably, in a pressing device at least one part of said supporting device, supporting device intermediate pieces, punch carriers, punch carrier plates, punch carrier height adjusting devices and/or height limiting stop elements are such constructed that they can be modular assembled. Furthermore, in a pressing device said punch carriers are movable in filling and pressing positions by means of piston/cylinder arrangements relatively to said base body.

BRIEF DESCRIPTION OF THE DRAWINGS

An embodiment will be described hereinafter in further detail with reference to drawings.

DETAILED DESCRIPTION OF THE PREFERRED EMBODIMENT

Figure 1:
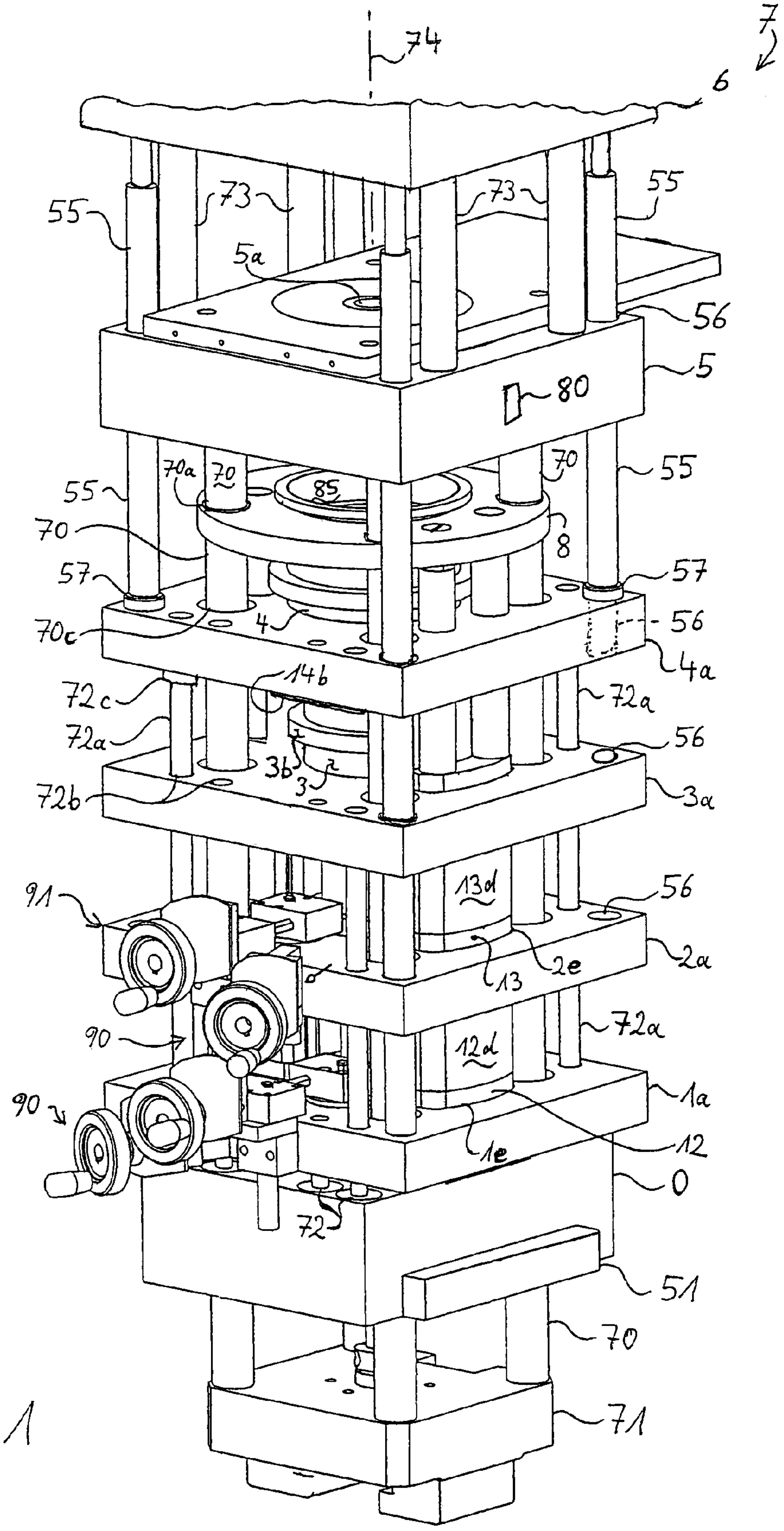
FIG. 1 illustrates a pressing device for manufacturing of shaped compacts from pulverized material in a lateral perspective view.
Figure 2:
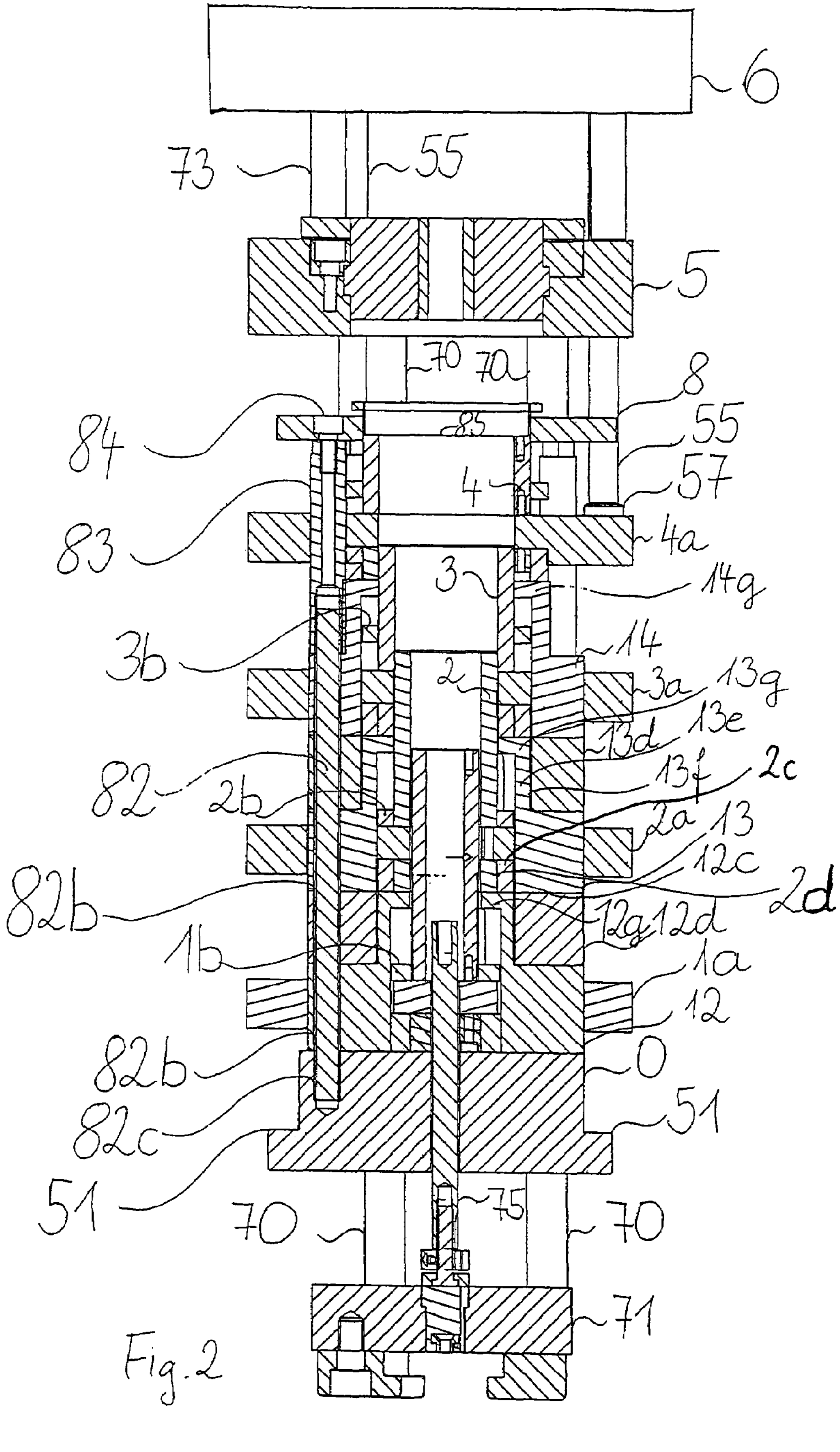
FIG. 2 illustrates a sectional view of the central components of said pressing device from a lateral direction.

As especially can be seen from FIGS. 1 and 2, a pressing device for pressing of shaped compacts from pulverized or granulated material, especially from iron powder, ceramic powder or the like, consists of a plurality of construction units. These are, especially, a lower press block being constructed by a base plate 0, punch carriers 1, 2, 3 and 4, a die holding plate 5 and a lower connection device 71, and an upper press block 6, which are arranged one above the other in the frame structure of pull rods 70, 73 and the like. In this arrangement, the upper press block 6, advantageously arranged in an mirror inverted way, can have similar structuring groups as the lower press block. The upper press block 6 can be constructed of for example an upper connection device, an upper ground plate and punch carriers.

The base plate 0 more generally also can be called base body and serves, among other things, for the reception of hydraulic piston cylinder arrangements 72, which serve for displacing of the above arranged punch carriers 1–4 relative to the base plate 0. The punch carriers 1–4 essentially consist of two components, each of them of an actual essential punch carrier 1–4 and a punch carrier plate 1*a*–4*a* laterally protruding therefrom. The punch carrier plates are comprising pull rod through leading openings 70*c*, through which the pull rods 70 pass through, so that the single punch carrier plates 1*a*–4*a* together with the punch carriers 1–4 can be displaced in pressing direction along the pull rods 70. Furthermore, the punch carrier plates 1*a*–4*a* are comprising piston rod through leading openings 72*b* to lead through the cylinder piston rods 72*a* passing from the hydraulic piston cylinder arrangements 72 from the base plate 0 through the cylinder piston rod through leading openings 72*b* to the punch carrier plate 2*a*, 3*a*, 4*a* to be moved by the corresponding cylinder piston arrangement relative to the base plate 0. At the corresponding punch carrier plate 2*a*, 4*a* the cylinder piston rods 72*a* are fixed or supported in such a way that the corresponding punch carrier plate 2*a*, 4*a* by the assigned cylinder piston rod 72*a* can be lifted up in upwardly direction.

According to a preferred embodiment on the upper side of the cylinder piston rod 72*a* a cylinder piston rod stop 72*c* is arranged, the lateral circumference of which is larger than the diameter of the cylinder piston rod through leading opening 72*b*, so that the cylinder piston rod stop attaches the assigned punch carrier plate 4*a* in an area around the assigned cylinder piston rod through leading opening 72*b* from below. This is to facilitate a particular modular system with a plurality of identically constructed punch carrier plates 2*a*, 3*a*, 4*a*, within each of which cylinder piston rod through leading openings 72*b* are provided in an uniform way for any arrangement of the punch carrier plates 2*a*–4*a* within the adapter. As usual, the punch carrier plates comprise central openings 1*e*, 2*e* to lead through the construction units, which are arranged centrally around the axis 74, especially punches, punch carriers and supporting devices.

The lower connection device 71 comprises a coupling device for coupling it to a lower press ram of a hydraulic press or the like. The upper press block 6 comprises a corresponding upper connection device having a coupling device for coupling to an upper press ram. Advantageously, by such an arrangement with the connection devices 71 an adapter 7 is built, which outside of a press can be prepared and established for the appropriate purposes as a tool frame before being inserted in a press with a few work-steps. This, accordingly, conditions short times of standstill of the actual press.

For connecting the lower press block and the upper press block 6 guide rods 73 are depicted, which are especially arranged in extension of the pull rods 70 of the frame structure. Thus, the frame structure holds together the whole single elements of the adapter 7. Thereby, guide rods 73 between the two press blocks are not necessarily required.

After installation of the pressing device or of the adapter 7 in a press, the lower connection device 71 is coupled to the lower press ram of the press. The base plate 0 is arranged above the lower connection device 71 via the pull rods 70, four of which preferentially lead through the four corner areas of the lower connection device 71. Alternatively, it is of course also possible to use more or fewer, e. g. only one or two pull rods.

According to the present embodiment, the base plate 0 has a rectangular exterior circumference, the four pull rods 70 leading through corresponding openings in the corner areas of the base plate. The base plate 0 comprises on each of two sides a bearing composition 1, via which the base plate 0, after insertion of the adapter 7, becomes connected with the main press cylinder of the press in such a way that the base plate 0 can be pressed upwardly or can be lowered downwardly in pressing direction along the central press axis 74 by the main press cylinder. Of course, alternatively, also other embodiments are possible, where the base plate 0 is firmly clamped into the pressing device and where the connection device 71 is coupled to the main press cylinder.

The base plate 0, serves as a supporting device for the single punch carriers 1–4, in the final press position, i.e., when the single punch carriers are pressed until the stop with the aid of the relative movement of the base plate 0 towards the die plate 5. Between the single punch carriers 1–4 and the base plate 0 there are arranged supporting devices for that purpose. The lowest one of the supporting devices 12 serves as supporting device for the second punch carrier 2, the supporting device 13 arranged above it serves for supporting of the third punch carrier 3, and the supporting device 14 depicted above it serves for the supporting of the fourth punch carrier 4.

The supporting devices shown consist of two lateral supporting elements 12a, 13a, 14a being arranged opposite are each other and being arranged in part cylindrically around the central press axis 74. In the upper section, the lateral supporting elements 12a, 13a, 14a each comprise at least on supporting surface 12b, 13b, 14b on which the punch carriers 2, 3 and 4, respectively, are supported. Furthermore, on this or on a further supporting surface 12c are supported supporting devices 13 being arranged above. Thereby, the supporting surface 12b for the punch carrier 2 is arranged being turned to the central press axis 74, and the supporting surface 12c for an above arranged supporting device 3 is arranged being turned away from the central press axis 74. According to the embodiment shown the supporting surfaces 12b, 13b, 14b for the punch carriers 2, 3 and 4, respectively, are formed especially annular and connect the lateral supporting elements 12a, 13a, and 14a, respectively, which are arranged correspondingly opposite to each other, of the supporting devices 2, 3 and 4, respectively, The free inside space is dimensioned between the lateral supporting elements 12a, 13a, 14a, which are arranged standing opposite to each other, in such a way, that through this free inside space a centrally arranged central pin as well as each of the punch carriers 1–3 from the underneath arranged supporting devices 0, 1, 2, 3 can be led through to the die 5. Thus, the lowest of such supporting devices 12 comprises a central passage opening, i.e. a through leading opening, for through leading of the central pin 75 and the first punch carrier 1. The second supporting device 13 arranged above comprises, in relation to this, a central through leading opening with a larger width for through leading of the central pin 75, of the first punch carrier 1 and for through leading of the second punch carrier 2, being thereby both the second punch carrier 2 as well as the second supporting device 13 supported on the lower supporting device 12. The third supporting device 14, which is supported upper side on an of the second supporting device 13 comprises a central through leading opening with a still broader width for through leading of the central pin 75, the first punch carrier 1, the second punch carrier 2, and the third punch carrier 3.

In order to arrange the single supporting devices 12–14, especially with respect to the adjustment movements during the pressing procedure, in a robust way one above the other, a tensioning plate 8 or clamp is arranged above these supporting devices. The tensioning plate 8 is arranged on the supporting surface 14c and is spaced from the uppermost supporting device 14 by tensioning plate bearing elements 81. The tensioning plate 8 can be tensioned with a tension anchor connection to the base plate 0. According to the embodiment shown a tension anchor tensioning consists of a clamping screw 82, which is screwed into a clamping screw reception bore 82c in the base plate 0, and which, in upwardly direction, is led through clamping screw through leading openings 82b, which are embedded in the lateral supporting elements 12a, 13a, 14a of the supporting devices 12, 13, 14. For tensioning the clamping screw 82 leads into a tension anchor tensioning element 83, which rests as tensioning abutment with its lower front side circumference on the supporting surface 14c of the upper supporting device 14 for tensioning the supporting devices 12, 13, 14 to the base plate 0. The clamping screw 82 leads into a central and front side threaded bore of the tensioning anchor tensioning element 83, so that, via a rotation of the tension anchor tensioning element 83 its front side lying on the supporting surface 14c of the upper supporting device 14 tensions the one above the other arranged supporting devices 12, 13, 14 to the base plate 0. To fasten the tensioning plate 8 the tension anchor tensioning element 83 comprises a threaded bore in the upper front side for the reception of a screw, the shaft of which is led through a corresponding bore in the tensioning plate 8.

The tensioning plate 8 also comprises a central through leading opening 86 being larger in relation to the central through leading opening leading through the uppermost supporting device 14, in order to lead through also the punch carrier 4 which is supported on the uppermost supporting device 14, besides the central pin 75 and the punch carriers 1, 2, 3, in direction of the die 5. Therefore, for these through led elements also a guiding function is provided.

Figure 3:
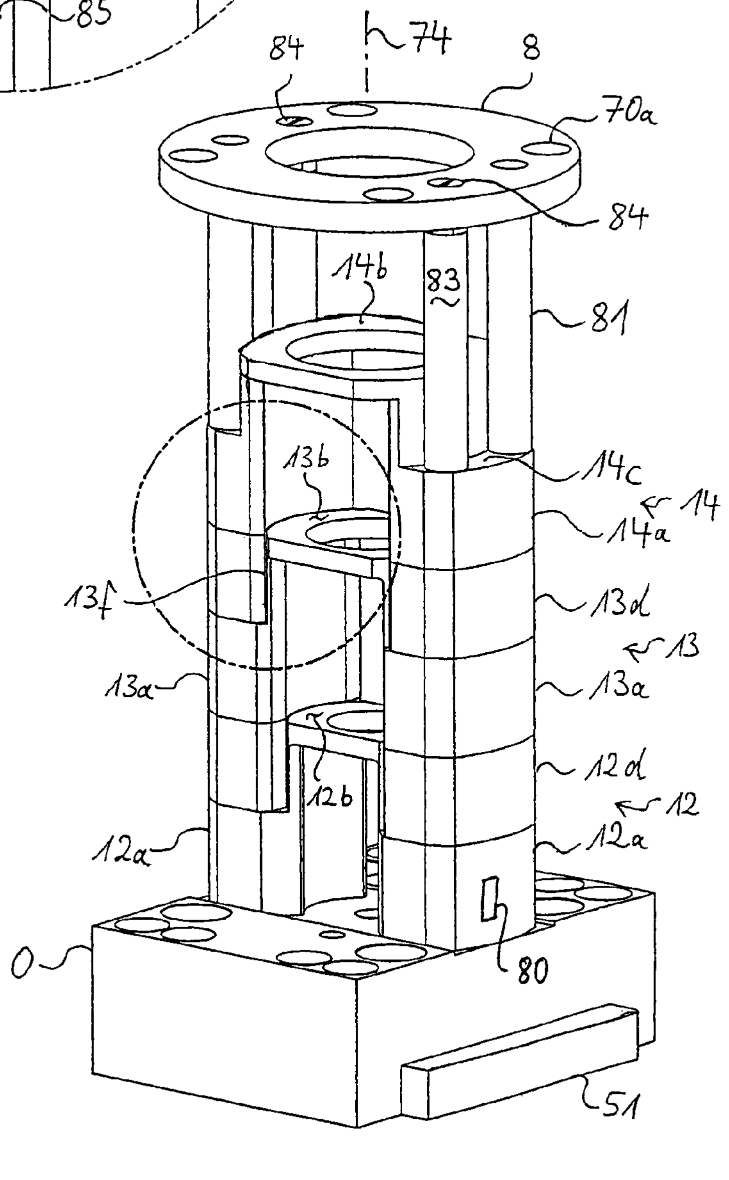
FIG. 3 illustrates a central arrangement comprising a base body including supporting devices, which are arranged level by level and a tensioning device for clamping of this arrangement.

The tensioning of the supporting devices 12, 13 and 14 arranged level by level one above the other to the base plate 0, therefore, tensioning a central tower, as shown in FIG. 3. This tensioned tower by the compact tensioning offers a robust guiding function for the single punch carriers and for the punches, which are arranged on them, when pressing takes place. In addition, the tensioning plate 8 being designed with such a large diameter makes possible that the pull rods 70 for the press frame are led through pull rod through leading openings 70a between the die holding plate 5 and the connection device 71. This offers advantages, when compared with ordinary arrangements, because the pull rods 70 get robust intermediate guide on the distance between the die holding plate 5 and the connection device 71 because the pull rod through leading openings 70a are arranged correspondingly narrow.

As especially can be seen from FIG. 3, the lateral supporting elements 12a, 13a, 14a of the supporting devices 12, 13, 14 on that side, which is turned away from the central press axis 74 are formed shorter than on the side, which is turned in direction to the central press axis 74. Thus, the corresponding supporting surfaces 12b, 13b, 14b for the punch carriers 2, 3 and 4, respectively, are on a higher level than the corresponding supporting surfaces 12c, 13c, 14c for the above arranged supporting devices 3, 4, the tension anchor tensioning elements 83, and the tensioning plate bearing elements 81, respectively. According to the embodiment shown, supporting device intermediate pieces 12d and 13d, respectively, are inserted between the supporting surface 12c, 13c and the bottom of the corresponding lateral supporting element, 13a, 14a. By variation of such supporting device intermediate pieces 12d, 13d having different heights, or embodiments without such supporting device intermediate pieces the height of the above arranged supporting devices 3, 4 and, therefore, also their supporting surface 13b, 14b for the punch carriers 3, 4 can be varied in a simple way. As especially can be gathered from the sectional view represented in FIG. 2, the width of the lateral supporting elements 12a, 13a, 14a become narrower, in upwardly direction, from level to level, in order to facilitate a correspondingly larger central through leading opening for the punch carriers.

Figure 4:
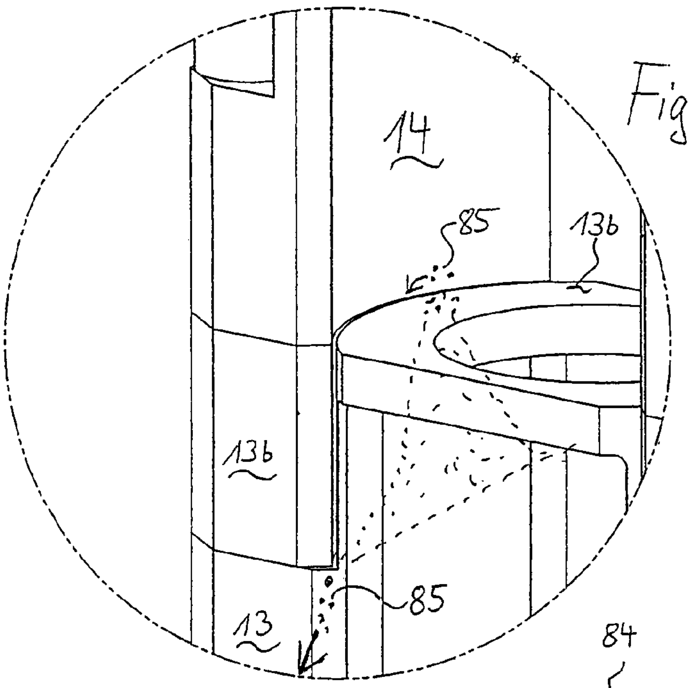
FIG. 4 illustrates a partial view thereof.

As can be seen from FIG. 4 showing a enlarged partial view of FIG. 3, a gap 13f is left between the exterior circumference walls of the wall sections 13e rising up through the stepped structure in direction to the central axis

74, and the neighboring supporting device intermediate piece 13*d*. This gap 13*f* serves for taking away powder 85, which as surplus or misdirected powder 85 falls down beside the punch carrier 3 onto the supporting surface 13*b* for this punch carrier 3. Such powder 85, can fall into the gap 13*f*, especially when adjusting movements take place, and is taken away from the gap 13*f* automatically sideward at the lower side after a bulk cone 85*a* has been built. Thus, this surplus powder 85 being taken away from the tower like construction until at least to the base plate 0, as a result of which wearing or even jamming during the operation are reduced.

As especially can be seen from the sectional view in FIG. 2, the supporting surfaces 12*b*, 13*b*, 14*b* of the punch carriers 2, 3 and 4, respectively, are formed in such a way, that they, in direction to the central axis, reach into the processing space, which is left by the interior circumference wall of the supporting devices 12, 13, 14, which are located underneath the supporting surfaces 12*b*, 13*b*, 14*b* formed in such way. Therefore, the size of the through leading opening is specified by the sections 12*g*, 13*g*, 14*g* projecting inwardly. Below these sections 12*g*, 13*g*, 14*g* projecting inwardly a free space is left for the guiding of a height limiting stop element 1*b*, 2*b* and 3*b*, respectively, between a through led punch carrier 1, 2 and 3, respectively, and the interior wall of the punch carrier supporting device 12, 13, 14. At the same time, the underside of the section 12*g*, 13*g*, 14*g* projecting inwardly serves with its underside as a supporting device stop element. The supporting device stop element 12*g*, 13*g*, 14*g*, thus, with its underside serves as a counter stop for the upper side of the height limiting stop element 1*b*, 2*b* and 3*b*, respectively, of the punch carrier 1, 2 and 3, respectively, which, in direction to the central axis 74, is directly neighbored to the supporting device stop element in the through leading opening.

The height limiting stop elements 1*b*, 2*b*, 3*b*, advantageously, are formed in a cylindrical way having an internal thread, wherein the internal thread meshes with a corresponding external thread on the exterior circumference of the punch carrier 1, 2 and 3, respectively. Thereby, the height of the height limiting stop elements 1*b*, 2*b*, 3*b* can be varied at the exterior circumference of the punch carriers 1, 2 and 3, respectively, by simply screwing them one against the other around the central axis 74.

Advantageously, the supporting device stop elements 12*g*, 13*g*, 14*g* serve, at the same time, with their upper side as supporting surface 12*b*, 13*b* and 14*b*, respectively, for the above arranged and supported punch carriers 2, 3 and 4, respectively. Because of this, the supporting devices 12, 13, 14 serve, at the same time, as end stop elements, in the final press position, for the punch carriers 2, 3 and 4, respectively, being put on. In order to vary the end stop height, there is arranged an end stop adjusting device in the transition area between the supporting surface 12*b*, 13*b*, 14*b* for the punch carriers 2, 3 and 4, respectively, and the punch carriers 2, 3 and 4, respectively. As it is generally known, such a height adjusting device can be constructed—e. g. such as is generally known from DE 40 00 423 C2—with annular elements being arranged one above the other each having a tilted plane turned one towards the other.

There is preferred, however, an end stop adjusting device or punch carrier height adjusting device 2*c* being constructed with a cylindrical element 2*c* that comprises an interior thread, which matches with a corresponding external thread on the outer surface of the punch carrier 2. This provides an arrangement, which comprises a—relative to the supporting device 12—stationary supporting adjusting element 2*c* and a—relative to the punch carrier 2—stationary punch carrier element 2*d*, lying especially cylindrically one in the other and having threads meshing one into the other. By rotating the end stop adjusting device 2*c* and the punch carrier 2 one towards the other, around the central press axis 74, the end stop height is being adjusted automatically.

Height adjusting drives 90 and 91, respectively, serve in order to operate the end stop adjusting device 2*c* and the height limiting adjustment, i.e. the height limiting stop elements 1*b*, 2*b*, 3*b*. Principally, these height adjusting drives 90, 91 can be constructed as generally known.

Figure 5:
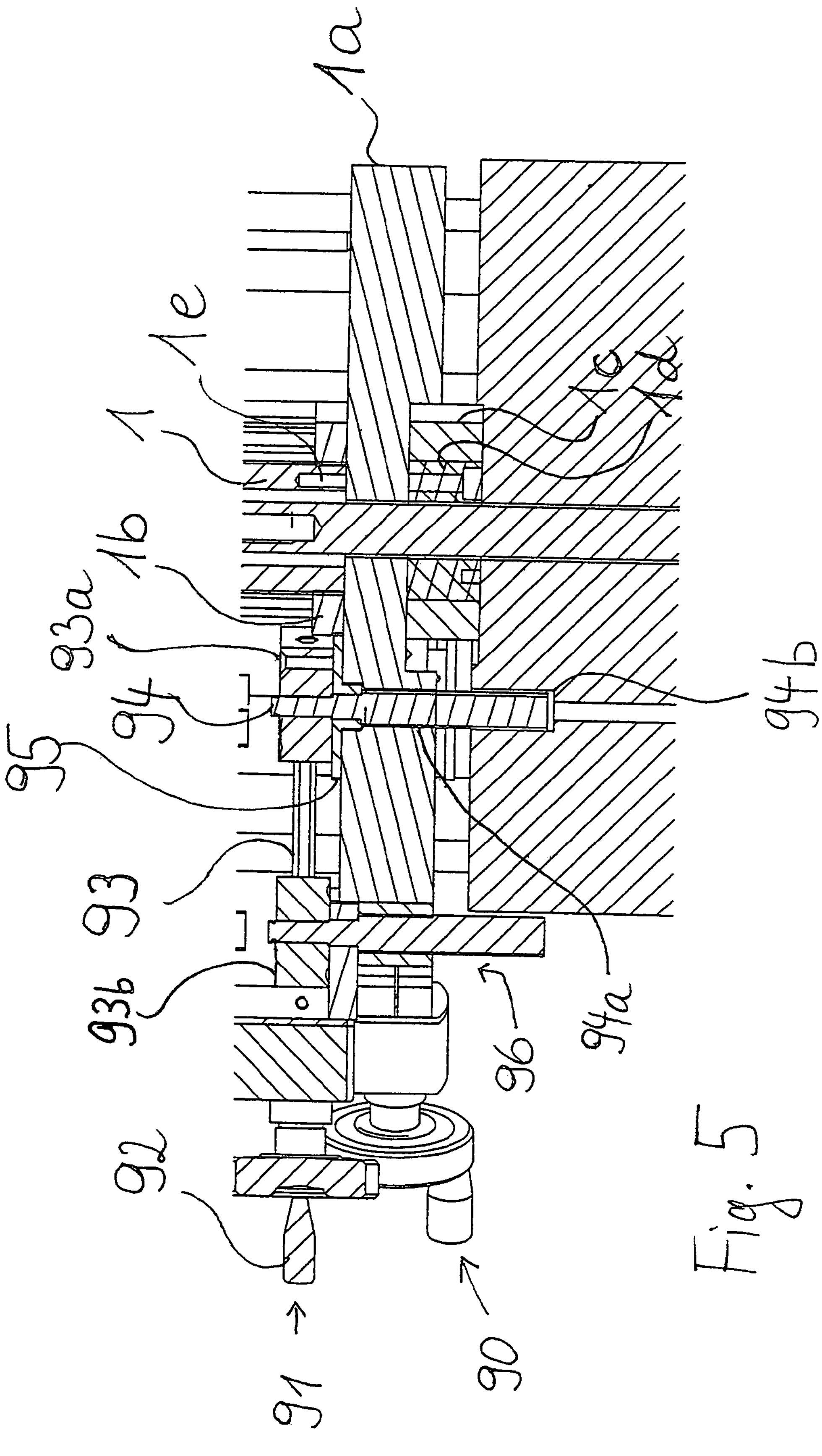
FIG. 5 illustrates a partial sectional view through a height adjusting device comprising a hand crank height adjusting drive for a height limiting stop at the punch carrier.

Whilst for height adjusting of the end stop for the punch carriers 1–4, usually, only a short stroke distance for adjustment is necessary, for the height limiting stop element 1*b* it is appropriate to make it possible to adjust it over a larger height distance of the assigned punch carrier 1. In order to facilitate this, a height adjusting drive 91 is preferred, which is shown in FIG. 5. There, the pitch ratio and the pitch gradient of the single involved threaded means should be adjusted in such a way that the height adjusting drive 91 is being driven preferably in upwardly or downwardly direction in the same dimension as the height limiting stop element 1*b* relatively to the punch carrier 1.

The height adjusting drive 91 shown comprises a hand crank to be activated, wherein alternatively, also a motor drive can be inserted. Together with the hand crank 92, a shaft 93 is brought into rotation, which leads into a worm gear housing. Within the worm gear housing 93*a*, the rotation movement of the shaft 93 is transformed into the rotation movement of a threaded spindle 94, which from below reaches into the worm gear housing 93*a*. The threaded spindle 94 leads in downwardly direction through the punch carrier plate 1*a* of the punch carrier 1 and comprises on its lower exterior circumference an external thread, meshing with an internal threaded of a thread spindle reception bore 94*a* embedded in the punch carrier plate 1*a*. Thus, by the rotation of the hand crank 92 and the shaft 93 the threaded spindle 94 is brought into rotation causing an unscrewing of the threaded spindle out of the threaded spindle reception bore 94*a* in upwardly direction and a screwing into it in downwardly direction, respectively. Thereby, also the hand crank 92, the shaft 93, and the screw casing 93*a* are moved in upwardly and in downwardly direction, respectively.

Underneath the worm gear housing 93*a* the threaded spindle 94 comprises a toothed wheel 95, which together with the threaded spindle 94 rotates around the rotating axis of the threaded spindle. The toothed wheel 95 meshes with its teeth into teeth, which are arranged on the exterior circumference of the height limiting stop element 1*b*. By rotation of the threaded spindle 94 and the toothed wheel 95 being connected with the threaded spindle, thus, the height limiting stop element 1*b* is put into rotation around the central axis 74. The height limiting stop element 1*b* is moved by the rotation around the punch carrier 1 in upwardly and downwardly direction, respectively, because of the meshing of the internal thread of the height limiting stop element 1*b* and the external thread on the exterior circumference of the punch carrier 1. By adjusting of the threads meshing one with the other between the height limiting stop element 1*b* and the punch carrier 1, on the one hand, and the threaded spindle 94 and the threaded spindle reception bore 94*a*, on the other hand, together with the movement of the height limiting stop element 1*b* in upwardly or downwardly direction also the whole height adjusting drive 91 is moved in upwardly and downwardly direction, respectively. The toothed wheel 95, thus, always remains meshing with the circumferential teeth of the height limiting stop element 1*b*, so that it is also possible to construct the latter as a construction element of relatively smaller height.

In the representation of the base plate 0 appropriate threaded spindle reception bores 94*d* having enough space are provided in the possibly colliding construction elements. In order to prevent, in the final press position, a collision of e. g. the threaded spindle 94 with the underneath arranged elements. Such threaded spindle reception bores 94*b,* at the same time, can serve for a better guidance of the height adjusting device. Furthermore, in order to provide an improved guidance and in order to avoid tilting, the shaft 93 can lead through a guiding device 93*b,* which comprises an element 93*c,* which protrudes out in upwardly and/or downwardly direction and which fits closely on an exterior wall of neighboring components, e. g. on the base plate 0, in a slidable and thus guiding way.

As can be seen from FIG. 5, the punch carrier 1 consists preferably of several single elements, which are arranged at the punch carrier plate 1*a.* Above the punch carrier plate 1*a,* there is an upper punch carrier section 1*c,* which takes the actual function of the punch carrier. Underneath the punch carrier plate 1*a* there is located the end stop adjusting device for adjusting the height of the end stop. Advantageously, it comprises a lower punch carrier section 1*d,* which is screwed onto the upper punch carrier section 1*c, e, g,* by means of a screw 1*f,* which leads through an appropriate bore formed in the punch carrier plate 1*a.* The upper punch carrier section 1*c* comprises an exteror circumference thread, which meshes with the height limiting stop element 1*b.* The lower punch carrier section 1*d* comprises an external thread, too, which meshes with the end stop adjusting device 1*e* making it possible by means of rotation of the last-named components 1*d,* 1*e,* one against the other, to adjust the height of the punch carrier 1 and of the punch carrier plate 1*a* relative to the base plate 0 and relative to the supporting devices 12, 13, 14 on higher levels, respectively.

According to the described arrangement of the supporting devices 12, 13, 14 comprising a supporting device element 12*g,* 13*g,* 14*g,* which reaches a bit into the open passage in direction to the central axis 74, advantageously, a dual function as stop element is made possible. On the one hand, the upper supporting surface 12*c,* 13*c,* 14*c* of the supporting device elements 12*g,* 13*g,* 14*g* serves as an end stop for the thereon supported punch carriers 2, 3 and 4, respectively. On the other hand, the lower side of the supporting device elements 12*g,* 13*g,* 14*g* serves as a counter stop for the upper edge of the corresponding height limiting stop elements, 1*b,* 2*b* and 3*b,* respectively, at the exterior circumference of the punch carriers 1, 2 and 3, respectively, which are supported underneath the supporting device 12, 13, 14. This facilitates a space saving and at the same time modular arrangement, providing nevertheless a high robustness when pressing movements take place and in the final press position.

As can be seen from FIG. 1, the modular arrangement of the single elements can also be equipped for the phase of powder transport, as far as a synchronization arrangement is concerned. When powder transport takes place, after the feeding of the die opening 5*a,* embedded in the die, with powder, and after driving down of the upper punch from the upper press block 6, until powder contact is established, the powder chamber being built is lowered in downwardly direction in a synchronous way, wherein the upper punch or the upper punches are synchronically lowered in relation to one or more punches of the lower press block. For facilitating of the synchronizing, synchronization rods 55, which are arranged in the upper press block 6, lead in downwardly direction through synchronization rod through leading openings 56 in the die plate 5 and in the punch carrier plates 2*a,* 3*a,* 4*a* to a punch carrier plate 4*a,* which is to be moved synchronously with the movement of the upper press block. In order to facilitate a modular build-up, in all punch carrier plates 2*a,* 3*a,* 4*a* the synchronization rod through leading openings 56 are designed. In order to attach the synchronization rod 55 at the selected punch carrier plate 4*a* a screwing, for example, can be carried out. In an especially simple embodiment the synchronization rod also can get put on a flange 57 or put into a shoe 57 exterior circumference of which is larger than the diameter of the synchronization rod through leading opening 56. As a result of which the synchronization rod presses with the flange or shoe 57, respectively, against the upper side of the selected punch carrier plate 4*a.* Usefully, in order to avoid tilting movements for each selected punch carrier plate two synchronization rods 55 diagonally facing each other are led to the selected punch carrier plate 4*a.* Principally possible, however, is also the use of more or fewer synchronization rods. This also is valid for the pull rods 70 and the like.

Useful, according to a further embodiment having an own independent inventive importance is also the arrangement of lengthening and compressing measuring devices 80, respectively, at the end stops and/or the punch carriers. Via such measuring devices the actual compression can be observed when pressing takes place, making it possible to control or control by closed loop correction of the pressing force and/or the adjusting of the height adjusting devices of the individual punch carriers. It is also possible, to check the constant powder quality with respect to alteration of the used powder charge. Especially, because of the supporting of the punches in the line of force such a measuring process in relation to earlier arrangements becomes meaningful, because bending effects of the punch carriers, which, up to now, falsified the measurements, can be neglected according to the present conception.

What is claimed is:

1. A pressing device for manufacturing of shaped compacts from pulverized or granulated material made from iron, plastics, hard metal, or ceramic material components, the pressing device comprising:

a frame structure being connectable adapter-like via a lower connection device with a lower press frame means of a press;

a die holding plate arranged in said frame structure;

a base body arranged in said frame structure, wherein said die holding plate and said base body are arranged in said frame structure to be displaceable relatively one to the other;

a plurality of punch carriers at least one part of them being displaceably mounted at said frame structure relatively to said die holding plate and relatively to said base body to be displaceable between them in the direction of a central axis running in press direction; and supporting devices supporting said punch carriers in a final press position relative to said base body, wherein said supporting devices are arranged between said base body and said punch carriers such that at least one of said supporting devices is supported by another of said supporting devices in relation to said base body.

2. The pressing device according to claim 1, wherein at least one of said punch carriers is adjustable by a punch carrier height adjusting device in direction to said central axis relative to said supporting device supporting this punch carrier.

3. The pressing device according to claim 2, wherein said punch carrier height adjusting device comprises a relative to said supporting device stationary supporting device adjusting element and a relative to said punch carrier stationary punch carrier element, which in especially cylindrically lie one in the other, and which have threads meshing into each other, effecting height adjustment relative to each other by screwing said punch carrier element and said supporting device adjusting element together one against the other around said central axis.

4. The pressing device according to claim 2, wherein said supporting device, especially in connection with said punch carrier height adjusting device, is dimensioned and arranged as an end stop for said final press position.

5. The pressing device according to claim 2 comprising at least one height adjusting drive, especially a hand crank mechanism or a motor, for adjusting said punch carrier height adjusting device, said height adjusting drive being moved relatively in the same direction as said punch carrier when adjusting takes place.

6. The pressing device according to claim 1 further comprising:

at least one synchronization rod for synchronizing an equally directed and equally spaced movement of an upper press block element in relation to at least one of said punch carriers, wherein said synchronization rod leads through leading openings formed in modularly constructed punch carrier plates laterally of above arranged punch carriers; and a synchronization rod stop element to support said synchronization rod at a selected punch carrier plate within an area around said synchronization rod through leading opening.

7. A pressing device for manufacturing of shaped compacts from pulverized or granulated material made from iron, plastics, hard metal, or ceramic material components, the pressing device comprising:

a frame structure being connectable adapter-like via a lower connection device with a lower press frame means of a press;

a die holding plate arranged in said frame structure;

a base body arranged in said frame structure, wherein said die holding plate and said base body being arranged in said frame structure to be displaceable relatively one to the other;

a plurality of punch carriers at least one part of them being displaceably mounted at said frame structure relatively to said die holding plate and relatively to said base body to be displaceable between them in the direction of a central axis running in press direction; and supporting devices supporting said punch carriers in a final press position relative to said base body, characterized in that said supporting devices are arranged between said base body and said punch carriers such that at least one of said supporting devices is supported by another of said supporting devices in relation to said base body;

wherein at least one of said supporting devices comprises a supporting device element, which sticks out or protrudes from a side of said supporting device in a direction toward said central axis carrying an assigned punch carrier.

8. The pressing device according to claim 7, wherein at least one of said supporting devices is arranged around said central axis and wherein around said axis is left a free space for through leading of punch carriers and punches, which are related to said base body and to said at least one of said supporting devices, respectively, being arranged below said supporting devices.

9. The pressing device according to claim 7, wherein at least one of said supporting devices centrally supports punch carriers and punches seated thereon and wherein said at least one of said supporting devices supports at least one further above arranged punch carrier in said final press position approximately in said line of force.

10. The pressing device according to claim 7, wherein at least one of said supporting devices, especially a protruding supporting device element, is dimensioned and arranged as stop element and is constructed to constitute a counter stop for a height limiting stop element of at least one of said punch carriers, of said base body, and of a lower arranged supporting device, respectively, in the filling or demolding positions.

11. The pressing device according to claim 10, wherein said height limiting stop element is arranged at said punch carrier being adjustable in height in direction of said central axis relative to said punch carrier.

12. The pressing device according to claim 11, wherein said punch carrier comprises an at least partly cylindrical exterior circumference having an external thread and wherein said height limiting stop element comprises on the inside an at least partly cylindrical interior circumference having an internal thread, said external thread and said internal thread being arranged meshing into each other causing said height adjustment relative to each other by screwing said punch carrier and said height limiting stop element one against the other around said central axis.

13. The pressing device according to claim 10 comprising at least one height adjusting drive, especially a hand crank mechanism or a motor, for adjusting the height of said height limiting stop element, said height adjusting drive being relatively moved in the same direction as said height limiting stop element when adjusting takes place.

14. The pressing device according to claim 7, wherein at least one of said punch carriers is adjustable by a punch carrier height adjusting device in direction to said central axis relative to said supporting device supporting this punch carrier and comprising at least one height adjusting drive, especially a hand crank mechanism or a motor, for adjusting said punch carrier height adjusting device, said height adjusting drive being moved relatively in the same direction as said punch carrier when adjusting takes place;

wherein said height adjusting drive drives a first threaded element, in particular a threaded spindle, moving said height adjusting drive relatively to said supporting device and relatively to said punch carrier, respectively and comprising a toothed wheel which is fastened on said threaded element and co-rotating around the longitudinal axis of said threaded element, said toothed wheel or one or more toothed gears, which are put in between, mesh with said toothing on said exterior circumference of said punch carrier height adjusting device or on said exterior circumference of said height limiting stop element, respectively, in a co-rotating way.

15. The pressing device according to claim 7, wherein at least one of said punch carriers is adjustable by a punch carrier height adjusting device in direction to said central axis relative to said supporting device supporting this punch carrier and comprising at least one height adjusting drive, especially a hand crank mechanism or a motor, for adjusting said punch carrier height adjusting device, said height adjusting drive being moved relatively in the same direction as said punch carrier when adjusting takes place;

wherein said height adjusting drive is constructed as being insertable into each other in a modular way by at least one threaded bore drill and/or a reception bore without a thread within it.

16. The pressing device according to claim 7 comprising at least one in particular modular actual position sensor for determining of a relative actual position between at least one of said punch carriers and said base body.

17. The pressing device according to claim 7 comprising a tensioning device for tensioning of said supporting devices supporting each other, in relation to said base body.

18. The pressing device according to claim 7, wherein at least one of said supporting devices comprises a supporting device supporting section for supporting of a higher arranged supporting device or for supporting of a supporting device intermediate means being put in between, said supporting surface of said supporting device supporting section being arranged more deeply than a punch carrier supporting surface.

19. The pressing device according to claim 18, wherein two supporting devices partly reaching one into the other and being arranged one above the other are arranged one in the other in such a way, that between the laterally neighboring surfaces there is a gap via which remaining powder is carried away laterally and at the same time in downwardly direction.

20. The pressing device according to claim 7, wherein at least one part of said supporting device, supporting device intermediate pieces, punch carriers, punch carrier plates, punch carrier height adjusting devices or height limiting stop elements are such constructed that they can be modular assembled.

* * * * *